United States Patent
Li et al.

(10) Patent No.: US 9,749,056 B2
(45) Date of Patent: Aug. 29, 2017

(54) METHOD AND SYSTEM FOR DISCRETE MULTI-TONE TRANSMISSION WITH MULTIPLE MODULATIONS

(71) Applicants: Chuandong Li, Ottawa (CA); Zhuhong Zhang, Ottawa (CA); Mahdi Zamani, Ottawa (CA)

(72) Inventors: Chuandong Li, Ottawa (CA); Zhuhong Zhang, Ottawa (CA); Mahdi Zamani, Ottawa (CA)

(73) Assignee: HUAWEI TECHNOLOGIES CO., LTD, Shenzhen (CN)

(*) Notice: Subject to any disclaimer, the term of this patent is extended or adjusted under 35 U.S.C. 154(b) by 196 days.

(21) Appl. No.: 14/596,875

(22) Filed: Jan. 14, 2015

(65) Prior Publication Data

US 2016/0204871 A1 Jul. 14, 2016

(51) Int. Cl.
*H04B 10/11* (2013.01)
*H04B 10/516* (2013.01)
*H04L 27/26* (2006.01)

(52) U.S. Cl.
CPC ..... *H04B 10/5161* (2013.01); *H04L 27/2601* (2013.01)

(58) Field of Classification Search
CPC .................................................. H04B 10/5161
USPC ....................................................... 398/183
See application file for complete search history.

(56) References Cited

U.S. PATENT DOCUMENTS 8,243,774 B2 * 8/2012 Khan ................ H04L 25/03866
375/141

2004/0081227 A1 * 4/2004 Lim ...................... H04L 5/026
375/140
2005/0276341 A1 12/2005 Umashankar
2007/0081604 A1 * 4/2007 Khan ...................... H04L 5/023
375/261

(Continued)

FOREIGN PATENT DOCUMENTS

| CN | 101834672 | | 9/2010 |
| CN | 101834672 A | * | 9/2010 |
| CN | 102035789 | | 4/2011 |
| CN | 102035789 A | * | 4/2011 |
| CN | 103684696 | | 3/2014 |
| CN | 103684696 A | * | 3/2014 |

OTHER PUBLICATIONS

Bosco, Gabriella et al.; "Performance Limits of Nyquist-WDM and CO-OFDM in High-Speed PM-QPSK System"; IEEE Photonics Technology Letters, vol. 22, No. 15, pp. 1129-1131; Aug. 1, 2010.

(Continued)

*Primary Examiner* — Juan A Torres
(74) *Attorney, Agent, or Firm* — Gowling WLG (Canada) LLP

(57) ABSTRACT

Optical network devices and method for optical network communications in discrete multi-tone (DMT) are provided. A serial information signal is converted to groups of bits and loaded to parallel processing branches based on bit rates of the parallel processing branches. Each branch is configured to encode the associated group of data bits on the associated tone. A first bit rate and modulation and power allocation to a first branch of the branches may be different from a second bit rate and modulation and power allocation to a second branch of the branches. To recover the incoming data, the encoded signal may be parallel-processed using branches with different demodulation formats and provide the serial data stream.

18 Claims, 11 Drawing Sheets

(56) References Cited

U.S. PATENT DOCUMENTS

| | | | |
|---|---|---|---|
| 2008/0049708 A1* | 2/2008 | Khan | H04B 1/713 370/343 |
| 2008/0159537 A1* | 7/2008 | Khan | H04L 25/03866 380/268 |
| 2009/0092040 A1* | 4/2009 | Dapper | G06F 17/14 370/208 |
| 2010/0190506 A1* | 7/2010 | To | H04L 5/0007 455/452.1 |
| 2011/0116566 A1* | 5/2011 | Takahashi | H04B 7/0671 375/267 |
| 2011/0255870 A1* | 10/2011 | Grigoryan | H04B 10/548 398/65 |
| 2014/0099116 A1 | 4/2014 | Bai et al. | |
| 2015/0372762 A1 | 12/2015 | Zhang et al. | |

OTHER PUBLICATIONS

Chow, Peter S. et al.; "A Practical Discrete Multitone Transceiver Loading Algorithm for Data Transmission over Spectrally Shaped Channels"; IEEE Transactions on Communications, vol. 43, No. 2/3/4, pp. 773-775; Feb./Mar./Apr. 1995.

Translation of Abstract and Partial translation of specification of cited Chinese reference 101834672.

International Search Report of corresponding international application No. PCT/CN2016/097386 dated Mar. 11, 2016.

Translation of Abstract and partial translation of specification of cited Chinese reference 103684696.

Translation of Abstract and Partial translation of specification of cited Chinese reference 102035789.

\* cited by examiner

METHOD AND SYSTEM FOR DISCRETE MULTI-TONE TRANSMISSION WITH MULTIPLE MODULATIONS

TECHNICAL FIELD

This application relates to optical transmission systems, and in particular to discrete multi-tone transmission systems.

BACKGROUND

Optical communication systems are widely used today for data communication. Optical communication systems may employ optical fibers as the transmission medium to support high data rates in long distance transmissions (e.g. long-haul optical systems). There are growing demand for ultra-high data-rate and bandwidth in optical communication networks providing challenges in designing networks. It is therefore desirable to provide flexible and adaptive network elements that allow for increased data rate with bandwidth efficiency.

SUMMARY

In accordance with an aspect of the present disclosure there is provided a device for optical discrete multi-tone (DMT) transmission. The device comprising a demultiplexer configured to convert a serial data to groups of bits and to load to each of a plurality of parallel processing branches with associated group of data bits, based on bit rates of the plurality of parallel processing branches. Each branch of the plurality of parallel processing branches configured to encode the associated group of data bits on an associated tone, a first bit rate and modulation to a first branch of the plurality of parallel processing branches being different from a second bit rate and modulation to a second branch of the plurality of parallel processing branches.

In accordance with another aspect of the present disclosure there is provided a method for optical discrete multi-tone (DMT) transmission. The method comprising receiving a stream of serial data and converting the serial data to groups of bits and loading to each branch of a plurality of parallel processing branches associated group of data bits, based on bit rates of the plurality of parallel processing branches. Each branch of the plurality of parallel processing branches configured to encode the associated group of data bits on an associated tone, a first bit rate and modulation to a first branch of the plurality of parallel processing branches being different from a second bit rate and modulation to a second branch of the plurality of parallel processing branches.

In accordance with another aspect of the present disclosure there is provided a device for processing optical discrete multi-tone (DMT) transmission. The device comprising a plurality of parallel processing branches configured to process a digital electrical signal of the DMT transmission having a plurality of encoded tones, each branch configured to process an encoded tone of the DMT transmission with a plurality of encoded tones therein to provide data bits, wherein a first branch of the plurality of parallel processing branches configured to process a first tone of a first demodulation format being different from a second demodulation format to a second branch of the plurality of parallel processing branches for a second tone. The device further comprising a multiplexer configured to receive the data bits from each of the plurality of parallel processing branches and to convert to a serial data stream.

In accordance with another aspect of the present disclosure there is provided a method for optical discrete multi-tone (DMT) transmission. The method comprising using a plurality of parallel processing branches configured to produce data bits from a digital electrical signal of the DMT transmission, each branch configured to process an encoded tone of the DMT transmission with a plurality of encoded tones therein to provide data bits, wherein a first branch of the plurality of parallel processing branches configured to process a first tone of a first demodulation format being different from a second demodulation format to a second branch of the plurality of parallel processing branches for a second tone. The data bits are received from each of the plurality of parallel processing branches and multiplexing the data bits to a serial data stream.

In accordance with yet another aspect of the present disclosure there is provided a computer readable non-transitory memory storing one or more programs, the one or more programs comprising instructions, which when executed by a computer device, cause the computer device to perform optical discrete multi-tone (DMT) transmission. A plurality of parallel processing branches configured to produce data bits from a digital electrical signal of the DMT transmission are utilized. Each branch configured to process an encoded tone of the DMT transmission with a plurality of encoded tones therein to provide data bits, wherein a first branch of the plurality of parallel processing branches configured to process a first tone of a first demodulation format being different from a second demodulation format to a second branch of the plurality of parallel processing branches for a second tone. The data bits from each of the plurality of parallel processing branches are received and multiplexing the data bits to a serial data stream.

BRIEF DESCRIPTION OF THE DRAWINGS

For a more complete understanding of this disclosure, reference is now made to the following brief description, taken in connection with the accompanying drawings and detailed description.

For simplicity and clarity of the illustration, elements in the drawings are not necessarily to scale, are only schematic and are non-limiting, and the same reference numbers in different figures denote the same elements, unless stated otherwise.

DETAILED DESCRIPTION

Figure 1:
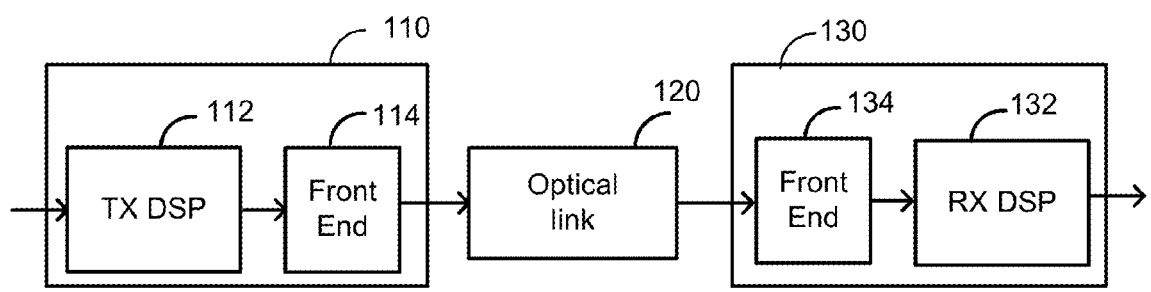
FIG. 1 is a schematic diagram of a coherent optical system.

Optical communication network elements and devices such as, a transmitter, a receiver, a transceiver and methods thereof, are described below, by way of example only, with reference to FIGS. 1-15. In the present disclosure, the transmitter and receiver are configurable to utilize a discrete multi-tone (DMT) modulation scheme for communications. In the DMT modulation, a plurality of tones (or sub-channels, sub-carriers, branches) are encoded with information bits to be transmitted. In the description, the terms "tones", "sub-channels", "sub-carriers", "channels" and "branches" may be used interchangeably. Unlike existing transceivers that use the same modulation format to multiple tones, the disclosed technique may increase a data rate using different modulation formats. With the different modulation formats, multiple tones may be encoded using flexible bit-loading (bit rate) where a group of data bits loaded to each tone may be optimized. Further, power-allocation to each tone may be optimized so that different modulations with different powers are used in the multiple tones. These flexible bit-loading and the power-allocation schemes may be based on the digital realization of a single wave signal with multi-modulated tones. The transmitter and receiver include software-programmable elements that may allow for various transmission schemes or modulation formats, data rates, bit rates, power-allocations, various compensation schemes and number of tones to be configured.

A device for optical discrete multi-tone (DMT) transmission may include: a demultiplexer configured to convert a serial data to groups of bits and to load to each of a plurality of parallel processing branches with associated group of data bits, based on bit rates of the plurality of parallel processing branches, and each branch of the plurality of parallel processing branches configured to encode the associated group of data bits on an associated tone, a first bit rate and modulation to a first branch of the plurality of parallel processing branches being different from a second bit rate and modulation to a second branch of the plurality of parallel processing branches.

A method for optical discrete multi-tone (DMT) transmission may include: receiving a stream of serial data; and converting the serial data to groups of bits and loading to each branch of a plurality of parallel processing branches associated group of data bits, based on bit rates of the plurality of parallel processing branches, each branch of the plurality of parallel processing branches configured to encode the associated group of data bits on an associated tone, a first bit rate and modulation to a first branch of the plurality of parallel processing branches being different from a second bit rate and modulation to a second branch of the plurality of parallel processing branches.

A device for processing optical discrete multi-tone (DMT) transmission may include: a plurality of parallel processing branches configured to process a digital electrical signal of the DMT transmission having a plurality of encoded tones, each branch configured to process an encoded tone of the DMT transmission with a plurality of encoded tones therein to provide data bits, wherein a first branch of the plurality of parallel processing branches configured to process a first tone of a first demodulation format being different from a second demodulation format to a second branch of the plurality of parallel processing branches for a second tone, and a multiplexer configured to receive the data bits from each of the plurality of parallel processing branches and to convert to a serial data stream.

A method for optical discrete multi-tone (DMT) transmission may include: using a plurality of parallel processing branches configured to produce data bits from a digital electrical signal of the DMT transmission, each branch configured to process an encoded tone of the DMT transmission with a plurality of encoded tones therein to provide data bits, wherein a first branch of the plurality of parallel processing branches configured to process a first tone of a first demodulation format being different from a second demodulation format to a second branch of the plurality of parallel processing branches for a second tone, and receiving the data bits from each of the plurality of parallel processing branches and multiplexing the data bits to a serial data stream.

A computer readable non-transitory memory storing one or more programs, the one or more programs comprising instructions, which when executed by a computer device, cause device processor to perform a method for optical discrete multi-tone (DMT) transmission may be provided.

The optical DMT transmission may include: receiving a serial data; and converting the serial data to groups of bits and loading to each of a plurality of parallel processing branches an associated group of data bits, based on bit rates of the plurality of parallel processing branches, each branch configured to encode the associated group of data bits on an associated tone, a first bit rate and modulation of a first branch of the plurality of parallel processing branches being different from a second bit rate and modulation to a second branch of the plurality of parallel processing branches.

The optical DMT transmission may include: using a plurality of parallel processing branches configured to produce data bits from a digital electrical signal of the DMT transmission, each branch configured to process an encoded tone of the DMT transmission with a plurality of encoded tones therein to provide data bits, wherein a first branch of the plurality of parallel processing branches configured to process a first tone of a first demodulation format being different from a second demodulation format to a second branch of the plurality of parallel processing branches for a second tone, and receiving the data bits from each of the plurality of parallel processing branches and multiplexing the data bits to a serial data stream.

FIG. 1 illustrates a coherent optical system 100, which forms a part of an optical communication network. The coherent optical system 100 includes a transmitter 110 and a receiver 130. The transmitter 110 is located on a transmitting side of the optical communication network and may be configured to send optical signals through an optical link 120 to one or more of the receiver 130 located on a receiving side of the optical communication network. In FIG. 1, the transmitter 110 and the receiver 130 are separately shown for the illustration purpose only. The transmitter 110 and the receiver 130 may be integrated to form a single transceiver device for bi-directional data communications.

The transmitter 110 and the receiver 130 include a multiple tones system that can utilize a DMT modulation for communications. The gap between neighbor tones may be optimized based on, for example, bandwidth limitations (resp. clock-recovery accuracy) for high (resp. low) gap values. Modulation of multi-tones (N tones, N>1) is optimized using different modulation formats where a modulation format to one tone may be different from that of another tone. The modulation formats may include, for example, M Quadrature amplitude modulation (QAM) (e.g., M=8, 16, 32, 64, 256, . . . ), a Quadrature Phase Shift Keying (QPSK) modulation, a binary Phase Shift Keying (BPSK) modulation, or any dual-polarization variant of these modulation forms. An example transmitted signal from the transmitter 110 is a single wave with modulated N tones, which may include orthogonal linear polarization components (X and Y) wherein each polarization component include two orthogonal phase components (in-phase and quadrature). The allocation of different formats to the tones may be determined based on tone's characteristics (e.g., bandwidth, SNR).

The transmitter 110 includes a digital signal processing (DSP) based transmitter unit (denoted as "TX DSP") 112, which is implemented as DSP software components or a combination of software and hardware. In the TX DSP 112, incoming information bits are processed in branches in parallel each associated with a tone. The TX DSP 112 is configured to encode or map information bit streams to symbols using a plurality of modulation formats. TX DSP 112 may include a polarization encoder for encoding (or transforming) symbols. In the description, the term "encoding", "mapping" and "modulating" may be used interchangeably. The TX DSP 112 is configured to optimize bit-loading to N branches for N tones with a flexible bit-loading scheme where bit rates for at least two tones may be different. The bit-loading among N tones may be determined based on the modulation configuration and/or tone's characteristics (e.g., available channel bandwidth, SNR). The TX DSP 112 is configured to optimize power-allocation to one or more of the symbols with a flexible power-allocation scheme. The transmitter 110 may include components for pulse-shaping, and/or components for compensation for distortion of signals. The transmitter 110 may include a front end 114 for transmission of optical signals to one or more of the receiver 130 via the optical link 120.

The receiver 130 includes a digital signal processing (DSP) based receiver unit (denoted as "RX DSP") 132, which is implemented as DSP software components or a combination of software and hardware. In the RX DSP 132 an incoming signal is de-multiplexed into signals with N tones, which are processed in parallel. The RX DSP 132 is configured to decode modulated N tones received from one or more of the transmitter 110 using multiple demodulation formats where one demodulation format of one of the tones may be different from another demodulation format of another one of the tones. The receiver 130 may include other components, such as components for compensation for distortion of signals, including chromatic dispersion compensation (CDC). The receiver 130 may include a front end 134 for receiving optical signals from one or more of the transmitter 110 via the optical link 120.

Signal reconditioning may be applied in the analog domain and/or digital domain to improve signal quality. Re-sampling and/or retiming may be applied to the digital signals to align and maintain the same symbol timing and durations as the transmitter 110.

The optical link 120 may include optical filters such as cascaded wavelength-selective switches (WSSs), fiber, amplifiers, and other components. The optical link 120 may include sources of chromatic dispersion (CD), nonlinear phase noise, polarization mode dispersion (PMD), polarization dependent loss (PDL), polarization dependent gain, polarization rotation and optical white Gaussian noise. The coherent optical system 100 is configured to compensate for distortion of signals due to the impairments of the optical link 120 and/or WSSs.

Figure 2:
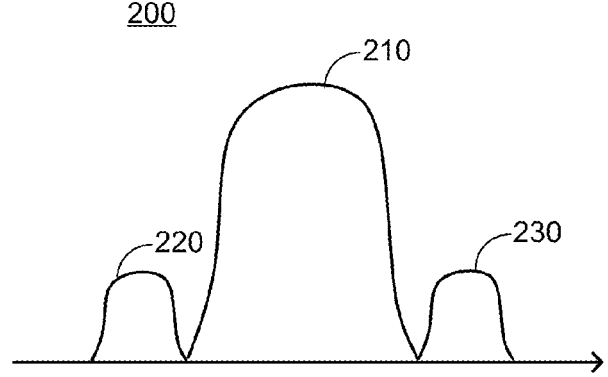
FIG. 2 is a frequency domain spectrum of an example of a discrete multi tone (DMT) signal with multiple tones.

FIG. 2 illustrates an example of a spectrum of a single wave DMT signal 200 with multiple tones 210, 220 and 230. In FIG. 2, three tones having middle tone 210 and side tones 220 and 230 are shown for illustration purposes only. The x-axis represents a radio frequency range, and the y-axis represents amplitude. The DMT signal may be obtained in the TX DSP 112 of FIG. 1 where a higher order modulation format may be used on the middle tone (210) while a lower order modulation format may be used on the side tones (220, 230).

Figure 3:
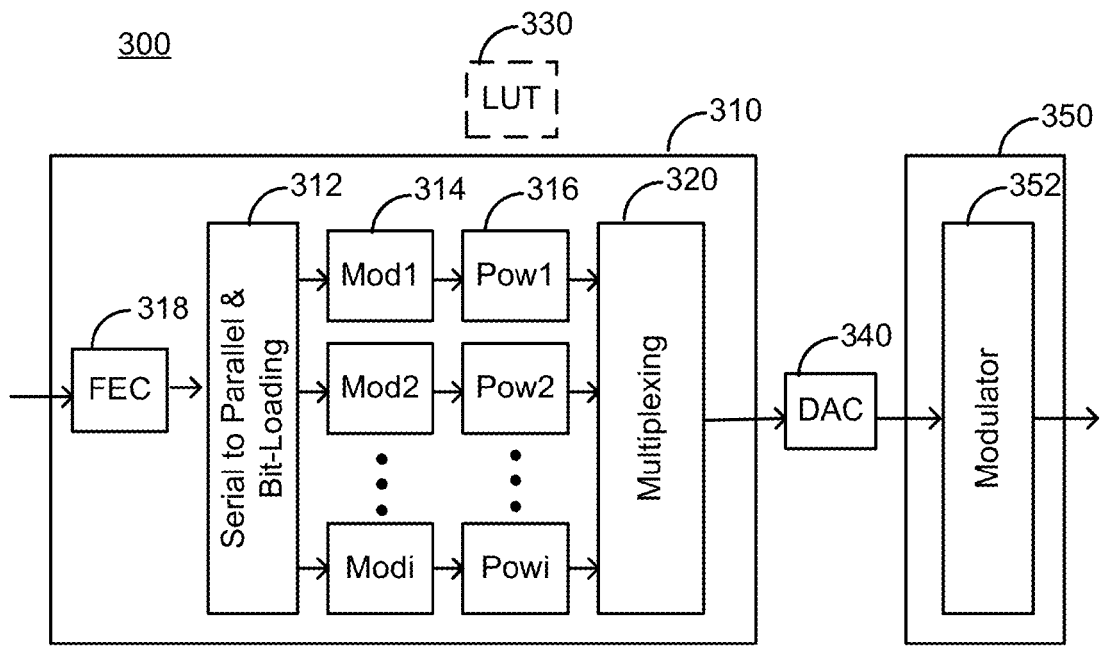
FIG. 3 is a block diagram of a transmitter of a multi-modulation DMT system.

FIG. 3 illustrates a transmitter 300 of a multi-modulation DMT system. The transmitter 300 includes a DSP based transmitter unit (denoted as "TX DSP") 310. The TX DSP 310 may correspond to the TX DSP 112 of FIG. 1. In FIG. 3, there are multiple parallel processing branches (the total number "i"), each for one tone. The TX DSP 310 encodes or maps incoming bit streams using encoding units (Mod1, Mod2, . . . , Modi, i>1) 314. In a polarization division multiplexed structure, the encoding unit (e.g. Mod1) on a branch has two branches for two polarization components, and the encoding unit performs symbol modulation in each of two branches. The TX DSP 310 includes a module 312 for converting an incoming bit stream into N bit streams (N groups of bits) for N branches and loading to each of N branches the associated group of data bits. Each group of data bits has one or more bits of the incoming bit stream, which is loaded to the associated branch for encoding the group of data bits on a tone to generate a symbol. A group of data bits to generate a symbol is flexibly allocated to a branch for encoding based on the associated modulation format. The TX DSP 310 includes a plurality of power allocators 316 (Pow1, Pow2, . . . , Powi), each being configured to adjust power of each symbol on a branch to divide the total power to the symbols. The flexible power-allocation may be implemented using a look-up table (LUT) 330. The LUT 330 may be internal or external to the TX DSP 310. The LUT 330 or values of the LUT 330 may be provided via a communication network.

The TX DSP 310 may include a FEC encoder 318 for processing incoming information bits. The TX DSP 310 may include a module 320 to multiplex modulated tones. The module 320 may include components for compensation of distortion and pulse-shaping. The compensation and pulse-shaping may be implemented on each branch in parallel. The compensation and the pulse-shaping may be implemented in a time domain or frequency domain. The transmitter 300 may include a front end 350 for transmission of modulated signals from the TX DSP 310 to an optical link (e.g., 120 of FIG. 1). The front end 350 may correspond to the front end 114 of FIG. 1. The front end 350 may be communicatively coupled to the TX DSP 310 via a digital to analog converter (DAC) 340. The front end 350 may include a modulator 352, e.g., an electrical to optical (E/O) converter, a driver, an amplifier, a filter, a laser, Polarization division Multiplexed (PM) in-phase and quadrature-phase (PM-I&Q) modulator, and other electrical and/or optical components.

In one implementation of the TX DSP 310, lower order modulations are used on side tones of N tones and higher order modulations are used on middle tones. By allocating different modulation formats to multiple tones at a fixed spectral efficiency, the bandwidth tolerance, and thereby, maximum achievable baud-rate (and correspondingly data-rate) is increased. In one implementation of TX DSP 310, the flexible power-allocation among N tones is implemented based on the available bandwidth and/or required SNR difference between the different modulation formats. The flexible power-allocation may be configured to keep the overall bit error rate (BER) at its lowest value.

Figure 4:
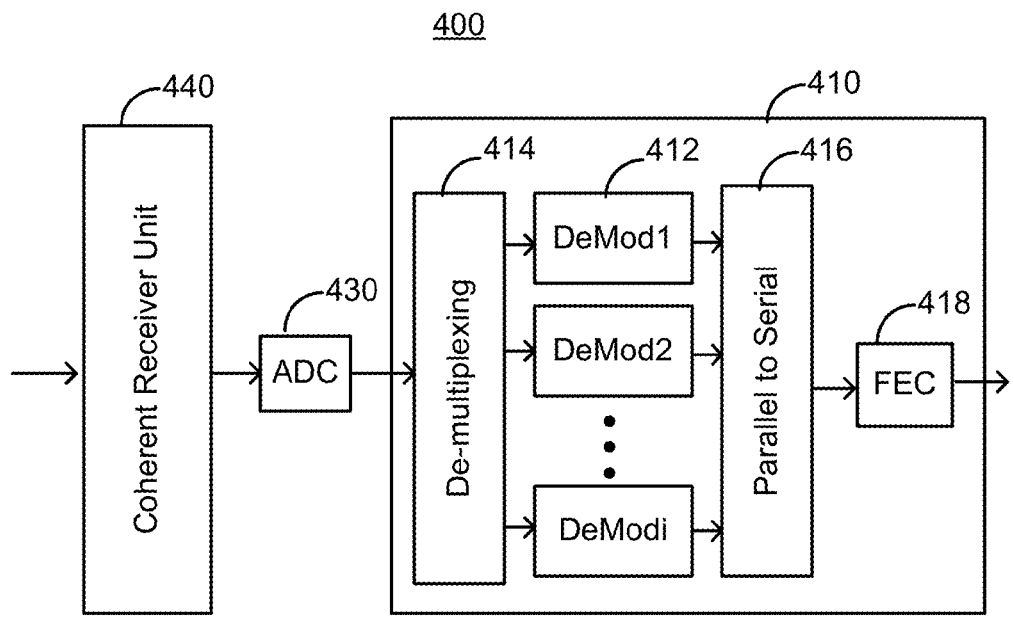
FIG. 4 is a block diagram of a receiver of a multi-modulation DMT system.

FIG. 4 illustrates a receiver 400 of a multi-modulation DMT system. The receiver 400 includes a DSP receiver unit (denoted as "RX DSP") 410. The RX DSP 410 may correspond to the RX DSP 132 of FIG. 1. The receiver 400 is configured to decode data transmitted from one or more of a transmitter (e.g. 300 of FIG. 3) using multiple demodulation formats. The RX DSP 410 includes a module 414 to de-multiplex a signal spectrum of an incoming signal into N tones. There are multiple parallel processing branches (the total number "i"), each for one tone. The RX DSP 410 decodes modulated tones using a plurality of decoding units (DeMod1, DeMod2, . . . , DeModi, i>1) 412. The decoding units 412 use multiple demodulation formats associated with multiple demodulation formats employed in a transmitter side (e.g., 300 of FIG. 3) where one demodulation format (e.g., Demod1) may be different from another format (e.g., Demod2).

The RX DSP 410 may include a parallel to serial convertor 416 for serializing decoded bits to restore in their original order, thereby recovering a serial information data signal. The RX DSP 410 may include other components, such as components for compensation of distortion of signals, e.g., CDC equalizers. The compensation may be implemented on each branch in parallel. The RX DSP 410 may include a FEC decoder 418. In the RX DSP 410, quasi-static channel impairments and also hardware impairments such as state-of-polarization (SOP) rotations, polarization mode dispersion (PMD), polarization-dependent loss (PDL), laser phase noise, PPM, frequency offset, I-Q and X-Y delay, I-Q imbalance, etc. may be compensated digitally. The RX DSP 410 may include a carrier recovery (CR) unit on each branch.

The receiver 400 may include a coherent receiver unit 440 for receiving optical signals from an optical link (e.g., 120 of FIG. 1). The coherent receiver unit 440 may correspond to the front end 134 of FIG. 1. The coherent receiver unit 440 may separate the received optical signal into orthogonal polarization components (e.g. an X-polarization component and a Y-polarization component) and orthogonal phase components (e.g. an in-phase (I) component and a quadrature-phase (Q) component). The coherent receiver unit 440 may convert the separated optical signal components into multiple analog electrical signals or components, where each I or Q component of the polarization components. The coherent receiver unit 440 may be communicatively coupled to the TX DSP 410 via an analog to digital converter (ADC) 430. The coherent receiver unit 440 may include a local oscillator (LO), a mixer and a photo-detector (e.g. a p-type/intrinsic/n-type (PIN) diode).

Figure 5:
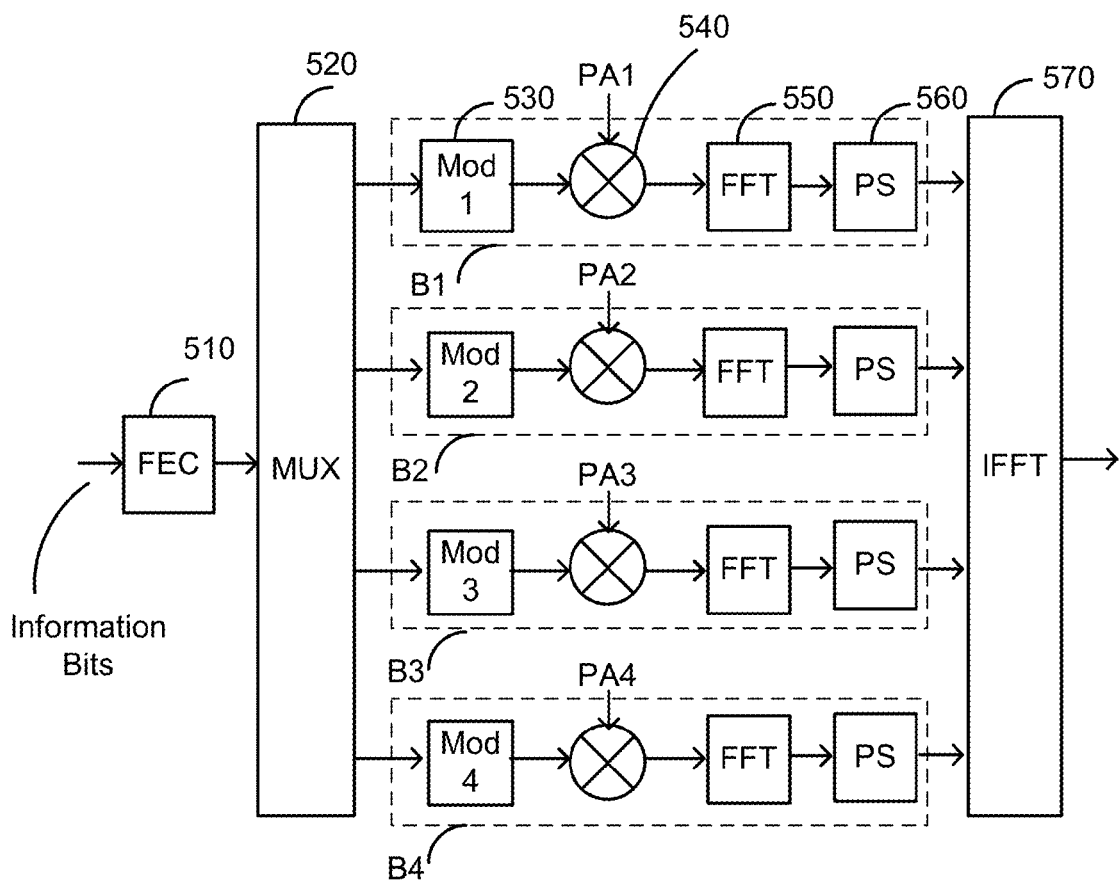
FIG. 5 is a block diagram of a transmitter DSP unit.

FIG. 5 illustrates a transmitter DSP unit 500. The DSP unit (denoted as "TX DSP") 500 may correspond to the TX DSP 112 of FIG. 1 or the TX DSP 310 of FIG. 3. The TX DSP 500 may be coupled to a front end (e.g., 114 of FIG. 1, 350 of FIG. 3) via a DAC (e.g., 340 of FIG. 3). The TX DSP 500 is a component of a coherent optical transmitter or transceiver. There are four branches (B1, B2, B3, and B4) for four tones. In this example, it is assumed that the total number of tones (branches) is four. The number of tones (branches) is not limited to four and the components may be scaled dependent on the tones. In the TX DSP 500, data is processed in a parallel structure and then multiplexed to transmit a single wave modulated DMT signal with four tones to a receiver side. The TX DSP 500 includes encoding units 530 (e.g., Mod1, Mod2, Mod3, Mod4), which are capable of using different modulation formats. The TX DSP 500 may include a FEC encoder 510 for processing incoming bits. Incoming information bits may be processed in the FEC encoder 510 and the information bits after the FEC encoder 510 may be parallelized in a multiplexer (MUX) 520 using a serial-to-parallel convertor. The encoding unit on a branch is configured to encode or map the associated information bit stream (group of data bits) on the branch onto a tone with a unique bit rate. The encoding unit maps each of a X polarization component and a Y polarization component to the corresponding symbol.

In one implementation of the TX DSP 500, the ratio of bit allocation to each branch relates directly to the number of bits per symbols of its corresponding modulation format. For instance, if the modulation formats for the side branches are both QPSK and the modulation formats for the middle branches are both 16QAM, the bit-rate allocation to the first and fourth branches is half of those for the second and third branches. Thereby, for every 6-bits as an input of the serial-to-parallel module (i.e., MUX 520), each of the side branches' encoding units (e.g., Mod1 and Mod4) receives 1 bit and each of the middle branches' encoding units (e.g., Mod2 and Mod3) receives 2 bits. In this example, the input bit-rates of the middle branches are twice of those of the side branches. Afterwards, the input bits of each branch are mapped to their corresponding DMT modulation symbols. From this point, the symbol-rates of all branches are the same. In a polarization multiplexed structure, this process is applied to each polarization.

The TX DSP 500 performs flexible power-allocation to each branch to emphasize one or more of the DMT symbols. In a polarization multiplexed structure, this process is applied to each polarization. The power-allocation may be implemented by mixers 540. The power allocation may be implemented after normalizing the RMS of the symbols in each branch. In one implementation, the power-allocation to each tone is optimized to achieve the lowest overall BER. For example, the symbols in the middle branches (e.g., B2, B3) are multiplied by a power factor of 2 (e.g., PA2, PA3=2; PA1, PA4=1), which compensates the required SNR difference between QPSK and 16QAM, thereby transmitting the middle tones with 6 dB higher SNR.

In one implementation, a multi-tone transceiver loading algorithm such as for example Chow's algorithm disclosed in "A Practical Discrete Multitone Transceiver Loading Algorithm for Data Transmission over Spectrally Shaped Channels" (IEEE Trans. Communications, vol. 4, no. 2/3/4, pp. 773-775, 1995") may be used to optimize the power-allocation and bit-loading.

The TX DSP 500 may include a module for converting the symbols after the power-allocation to sub-channel signals in the frequency domain. The TX DSP 500 may include pulse-shaping (PS) modules 560 for pulse-shaping, each allocated to a branch. The PS modules 560 may implement pulse-shaping independently on the tones using discrete small FFTs 550. The pulse-shaping may be implemented in the time domain. The TX DSP 500 may include one or more other components for pre-compensation for distortion of signals on each branch. The signal after pre-compensations may go through a DAC (e.g., 340 of FIG. 3) and a modulator (e.g., 352 of FIG. 3) to be transmitted. The TX DSP 500 may include IFFT 570 to output samples of modulated and multiplexed signals in the discrete time domain. The IFFT 570 may have enough number of taps to output a signal with four modulated tones.

Figure 6:
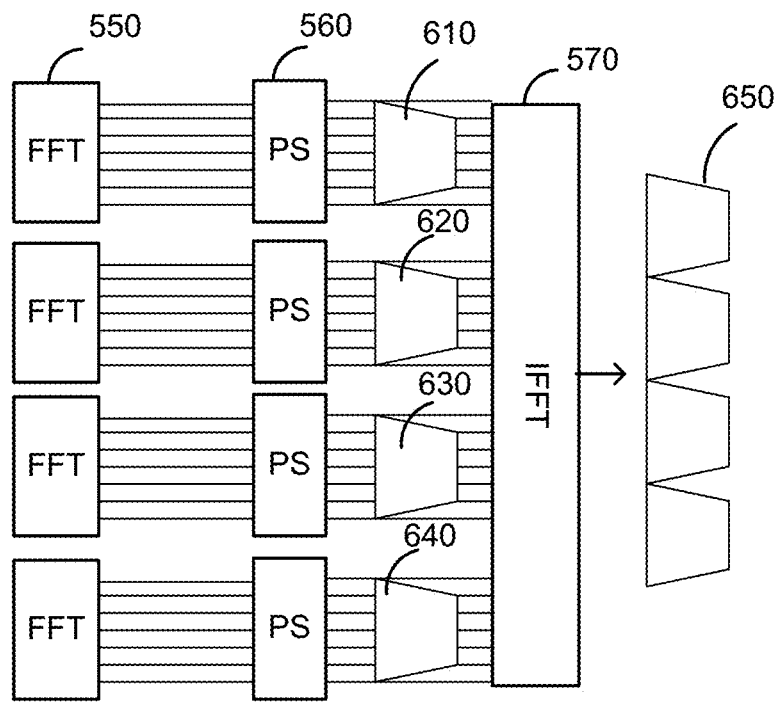
FIG. 6 illustrates an example of a multi-tone schemes taken in the DSP unit of FIG. 5.

FIG. 6 illustrates a multi-modulated tone scheme taken in the TX DSP 500 of FIG. 5. In FIG. 6, four modulated frequency tones 610, 620, 630, 640 in the frequency domain are schematically illustrated. At the output of the IFFT 570, the spectrum of an output signal from the IFFT 570 has four modulated tones 650 (in general N modulated tones).

Figure 7:
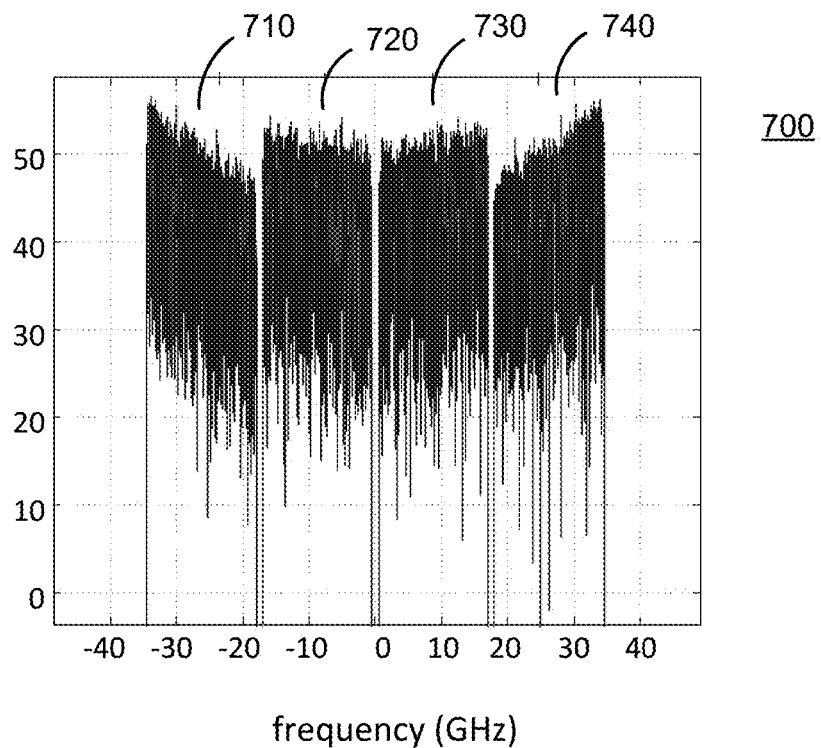
FIG. 7 illustrates an example of a spectrum view of outputs from the DSP unit of FIG. 5 before DAC.

FIG. 7 illustrates an example of a spectrum view 700 of an output from the TX DSP 500 of FIG. 5 before DAC (e.g., 340 of FIG. 3). The x-axis represents frequency and the y-axis represents amplitude. The spectrum 700 of the output includes components 710 and 740 for 2 side tones among 4 tones on side branches and components 720 and 730 for middle 2 tones among 4 tones on middle branches. The components 710 and 740 are obtained, for example, in B1 and B4 of FIG. 5, and the components 720 and 730 are obtained, for example, in B2 and B3 of FIG. 5.

Figure 8:
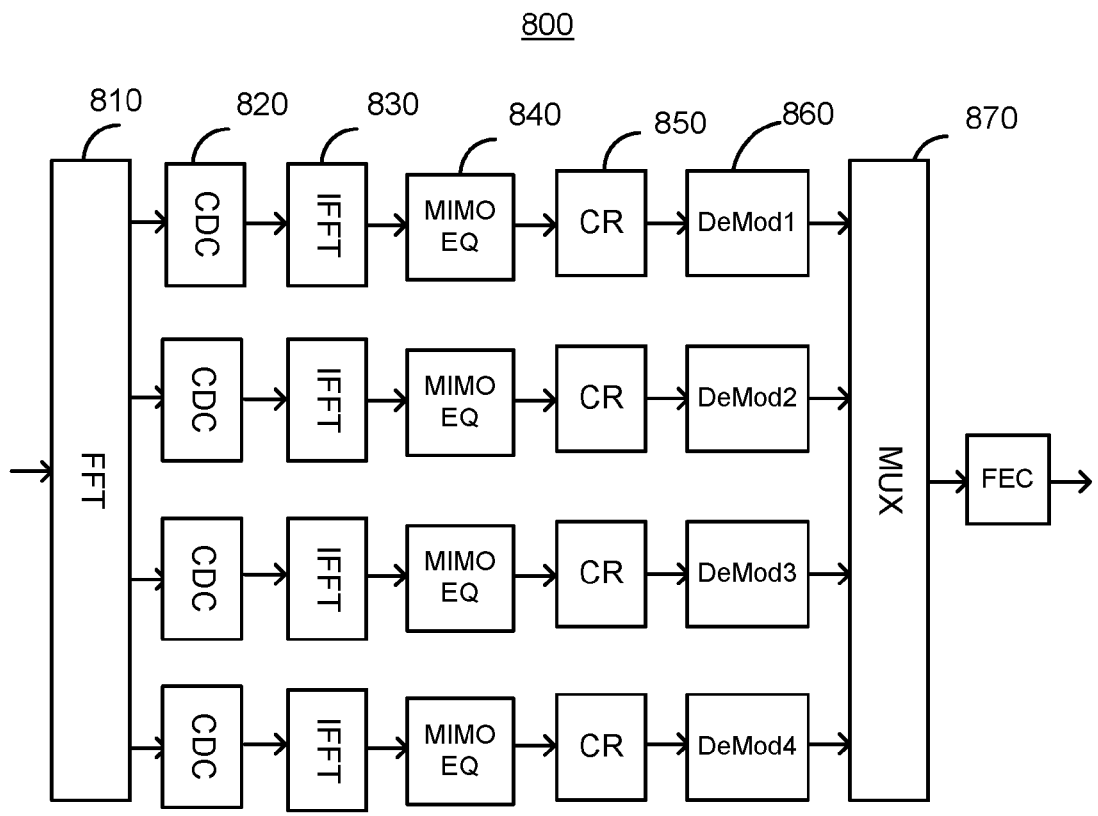
FIG. 8 is a block diagram of a receiver DSP unit.

FIG. 8 illustrates a receiver DSP unit 800. The DSP unit (denoted as "RX DSP") 800 is a component of a coherent optical transceiver. The RX DSP 800 may correspond to the RX DSP 132 of FIG. 1 or the RX DSP 410 of FIG. 4. The RX DSP 800 may be coupled to a front end (e.g., 134 of FIG. 1) or a coherent receiver unit (e.g. 440 of FIG. 4), via an ADC (e.g., 430 of FIG. 4). In the RX DSP 800, an incoming signal with modulated four tones is processed in a parallel structure in accordance with a scheme of a transmitter (e.g., 500 of FIG. 5). In this example, it is assumed that the frequency spectrum of the incoming signal is de-multiplexed into four tones, however the number of tones is not limited to four. The RX DSP 800 includes decoding units 860 (e.g., DeMod1, DeMod2, DeMod3, DeMod4), which are capable of using different demodulation formats. The demodulation formats correspond to modulation formats employed in the transmitter. The RX DSP 800 decodes or demodulates the symbols based on the demodulation formats where one of the demodulation formats (e.g., DeMod1) may be different from another demodulation format (e.g., DeMod2).

The RX DSP 800 may use an FFT 810 to de-multiplex or slice frequency spectrum of a received single wave signal into four frequency tones, which may be implemented after filter compensation. The RX DSP 800 may include match filter, components for compensation components, such as CD compensations (CDCs) 820 and MIMO equalizers 840. The outputs of the CDCs 820 may be connected to small IFFTs 830. The MIMO equalizers 840 may be used for a multiplexed polarization coherent optical channel. The RX DSP 800 may include carrier recovery blocks (CRs) 850 to track and compensate any mismatch in frequency and/or phase between an oscillator at the transmitter and a local oscillator at the receiver side.

The signal of each polarization, after post-compensation, may be de-multiplexed into four tones of DMT in accordance to the corresponding transmitter (e.g., 500 of FIG. 5). After processing the tones and decoding them in a parallel structure, the decoded bits of each branch (with different bit rates according to their corresponding modulation formats) may be serialized using a parallel to serial converter (e.g., multiplexer 870), thereby recovering a serial information data signal.

Figure 9:
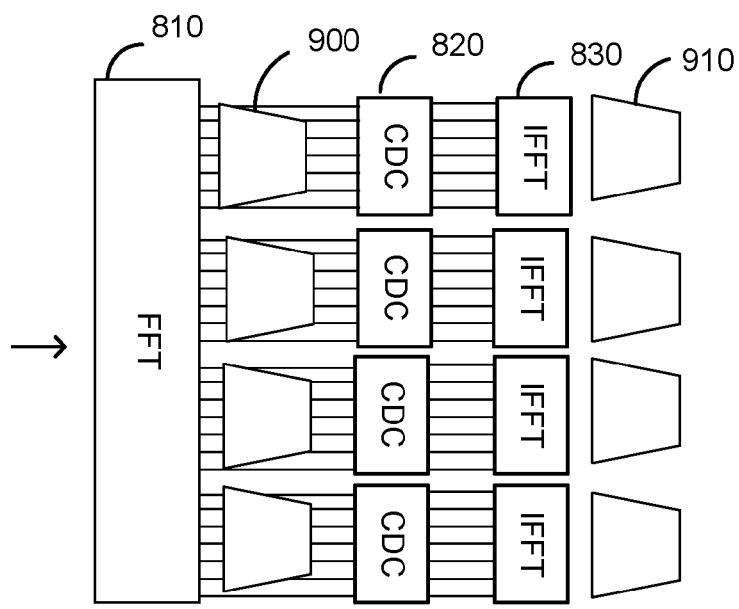
FIG. 9 illustrates a multi-modulated tone scheme taken in the DSP unit of FIG. 8.

FIG. 9 illustrates a multi-modulated tone scheme taken in the RX DSP 800 of FIG. 8. In FIG. 9, the FFT 810 outputs four modulated tones 900 in frequency domain, which are processed in the CDCs 820 and converted in the IFFTs 830. At the output of the IFFTs 830, the spectrum of a modulated signal in time domain has four modulated tones 910.

In DMT, due to the nulls in the signal spectrum, Low-Frequency Oscillation (LOFO) can be estimated accurately in frequency domain. In DMT CD can be compensated for each tone independently. Since CD follows a parabolic function of frequency, decreasing the tone bandwidth by M results in decreasing FFT resolution by $M^2$. This leads to reduce the hardware resources in frequency domain equalizer (FDEQ). Thus, in one implementation of CDC, only parabolic part of CD is compensated in each tone, i.e., instead of compensating $\exp(jD(f-f_0)^2)$ where $f_0$ is the centre frequency of that tone, the RX DSP 800 compensates $\exp(jDf^2)$ and leave $\exp(-j2Df_0f)+\exp(jDf_0^2)$ to be compensated in framer and carrier phase recovery modules. Due to the linear residual phase of CD in $\exp(-j2Df_0f)$, the windowing may be optimized in overlap-and-save method.

Implementation of complex estimation methods (e.g., Maximum Likelihood Sequence Estimator (MLSE)) may be optional. In case of narrow bandwidth filtering (e.g., large number of WSS, low RF bandwidth, etc.), only the side tones are affected. Thus, the complex estimation methods may be optionally implemented only on the side tones, which lead to more efficient and less complex hardware design. In the presence of very close neighbor channel (e.g., DWDM, super channel, etc.), only side tones are interfered by inter-channel interference (ICI). Thus, ICI equalizers may be performed only on side sub-channels, which lead to ICI equalizer complexity reduction. The complexity of implementation of DSP algorithms (e.g., MLSE, ICI equalizer) is thereby decreased.

Figure 10A:
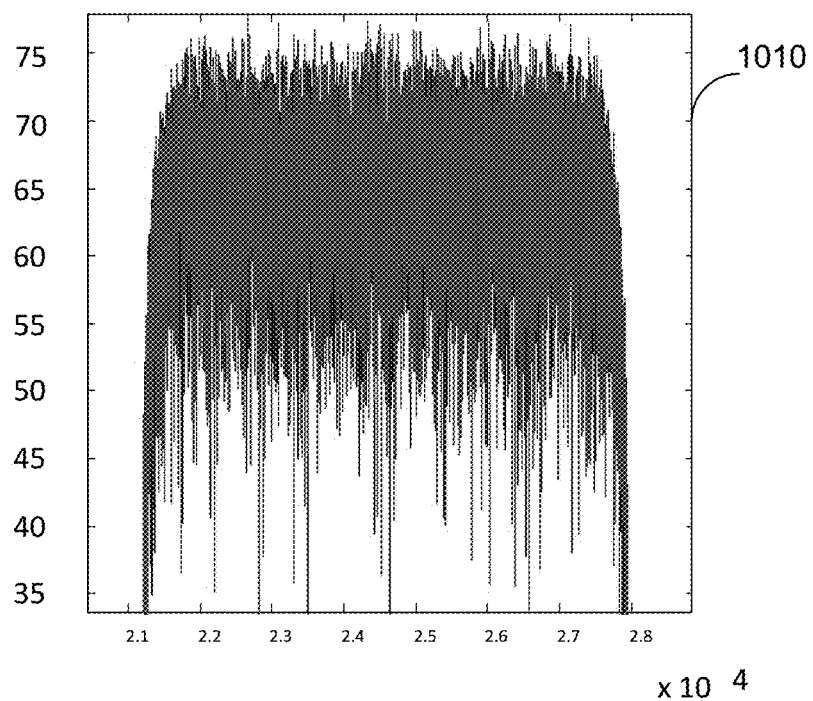
FIG. 10A illustrates an example of a single carrier spectrum of a single carrier modulated signal received at a single carrier receiver.
Figure 10B:
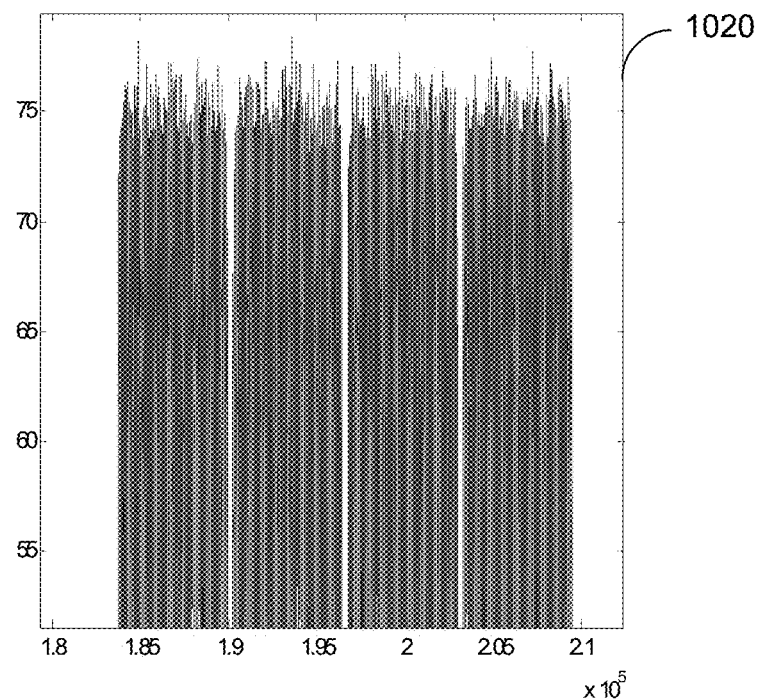
FIG. 10B illustrates an example of a 8QAM-DMT spectrum of a signal received at a DMT receiver.
Figure 10C:
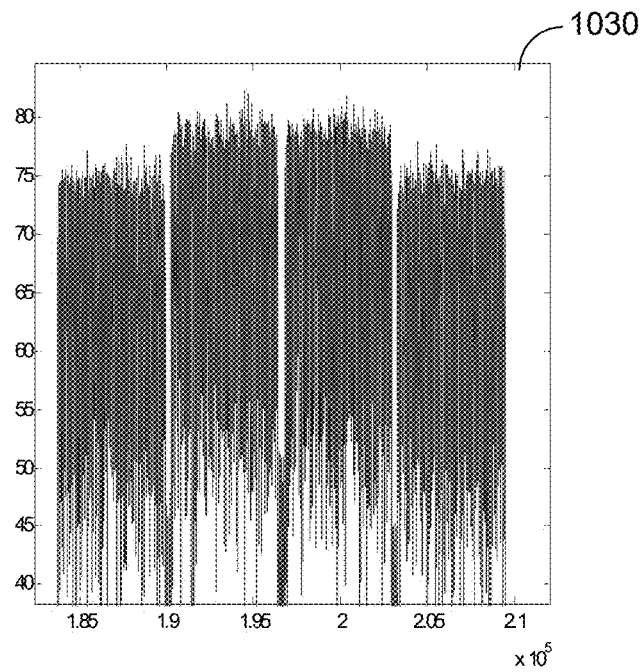
FIG. 10C illustrates an example of a multi-modulation DMT spectrum of a signal received at a multi-modulation DMT receiver, with QPSK as side tones and 16QAM as middle tone.

FIGS. 10A-10C illustrate examples of frequency spectra views 1010, 1020 and 1030. The x-axis represents frequency and the y-axis represents amplitude. The spectrum 1010 shown in FIG. 10A is a single carrier spectrum of a single carrier modulated signal received at a single carrier receiver. Spectrum 1020 shown in FIG. 10B is a 8QAM-DMT spectrum of a signal received at a DMT receiver. Spectrum 1030 shown in FIG. 10C is a multi-modulation DMT spectrum of a signal transmitted from a transmitter (e.g., TX DSP 500 of FIG. 5) and received at a receiver (e.g., RX DSP 800 of FIG. 8).

Figure 11:
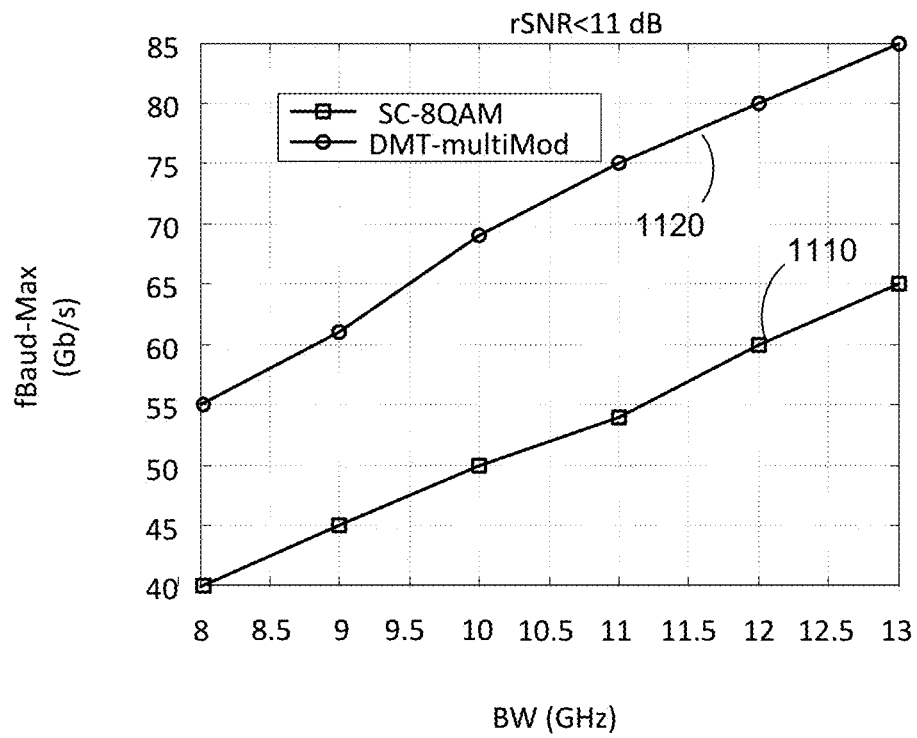
FIG. 11 illustrates simulation results showing maximum achievable baud-rate versus RF bandwidth views.

With respect to the spectrum 1030 of FIG. 10C, QPSK is applied on side tones among four tones and 16 QAM is applied on middle tones among four tones. The flexible power-allocation is performed to minimize the optical signal to noise ratio (OSNR) at pre-FEC, BER $2.6e^{-2}$. Coherent polarization division multiplexed (PDM) scenario is considered. Pulse-shaping is root raised-cosine with roll-off-factor of 0.1. The space between the tones is set to $0.06f_B$. Throughput $R=2\ f_B * E\{bit/sym\} * OH\ \%$. Thus, for fixed overhead and average bits/symbol $R=Kf_B$, where K is a constant. Hence, instead of maximum data-rate, maximum achievable baud rate versus RF bandwidths is plotted as shown in FIG. 11. It is assumed that at most 1 dB away from additive white Gaussian noise (AWGN) limit of 8QAM is acceptable where the required SNR for 8QAM at the target BER is 9.7153 dB. It can also be assumed that 8-bit ADDA, and quantizers are also optimized for every single case. Tx RF bandwidth and Rx RF bandwidth are considered equal.

FIG. 11 illustrates maximum achievable baud rate versus RF bandwidths plots 1110 and 1120. The plot 1110 is calculated using a single-carrier (SC) 8QAM transceiver model where information is transmitted using a single-carrier with several tones. The plot 1120 is calculated using a multi-modulation DMT system with a transmitter (e.g., 110 of FIG. 1, 300 of FIG. 3, 500 of FIG. 5) and a receiver (130 of FIG. 1, 400 of FIG. 4, 800 of FIG. 8). It shows that power allocated and bit-loaded DMT increases maximum baud-rate around 30-40%.

Figure 12:
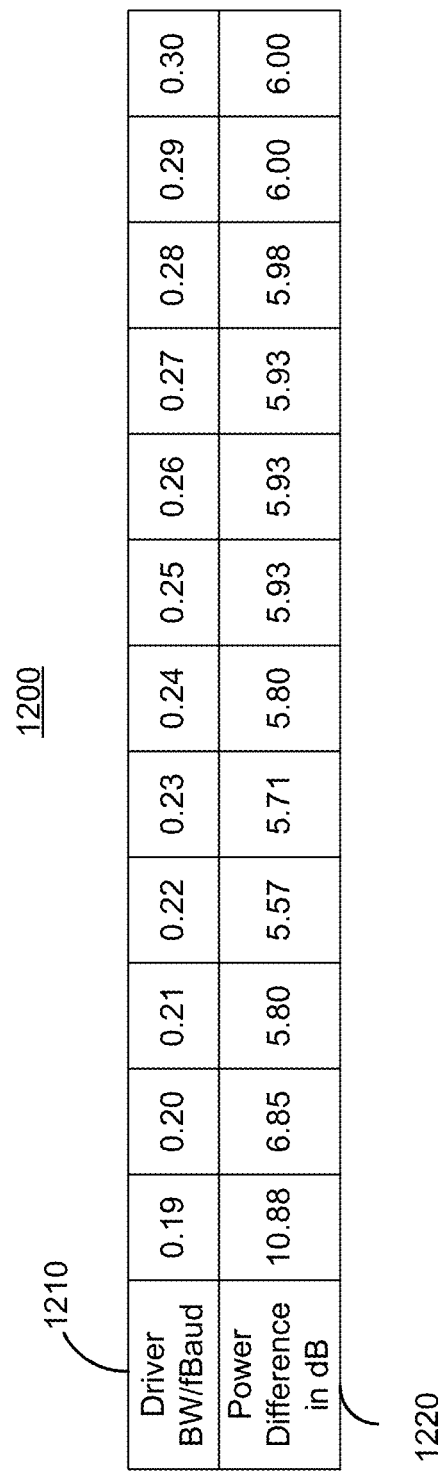
FIG. 12 is a schematic diagram of an example look up table for power allocation in FIG. 10.C.

FIG. 12 illustrates an example of a look-up table (LUT) 1200. The LUT 1200 defines a relationship between modulation formats and power-allocation boundary for the flexible power-allocation. In this example, the LUT 1200 is for a transceiver for a four-tone DMT with QPSK at two side tones and 16QAM at two middle tones. For example, the LUT 1200 is used in the TX DSP 500 of FIG. 5. The top row 1210 of the LUT 1200 is the ratio of Tx-RF and RX-RF bandwidths over the baud-rate. It is assumed that TX-RF and RX-RF bandwidths are equal. The bottom row 1220 of the LUT 1200 is the power ratio allocated to the middle tones versus side tones (in dB). For example, if RF bandwidth is 0.3*fBaud, the transceiver allocates 6 dB higher power to 16QAM channels compared to QPSK channels. Different LUTs may be applied on symbols for the flexible power-allocation.

Figure 13:
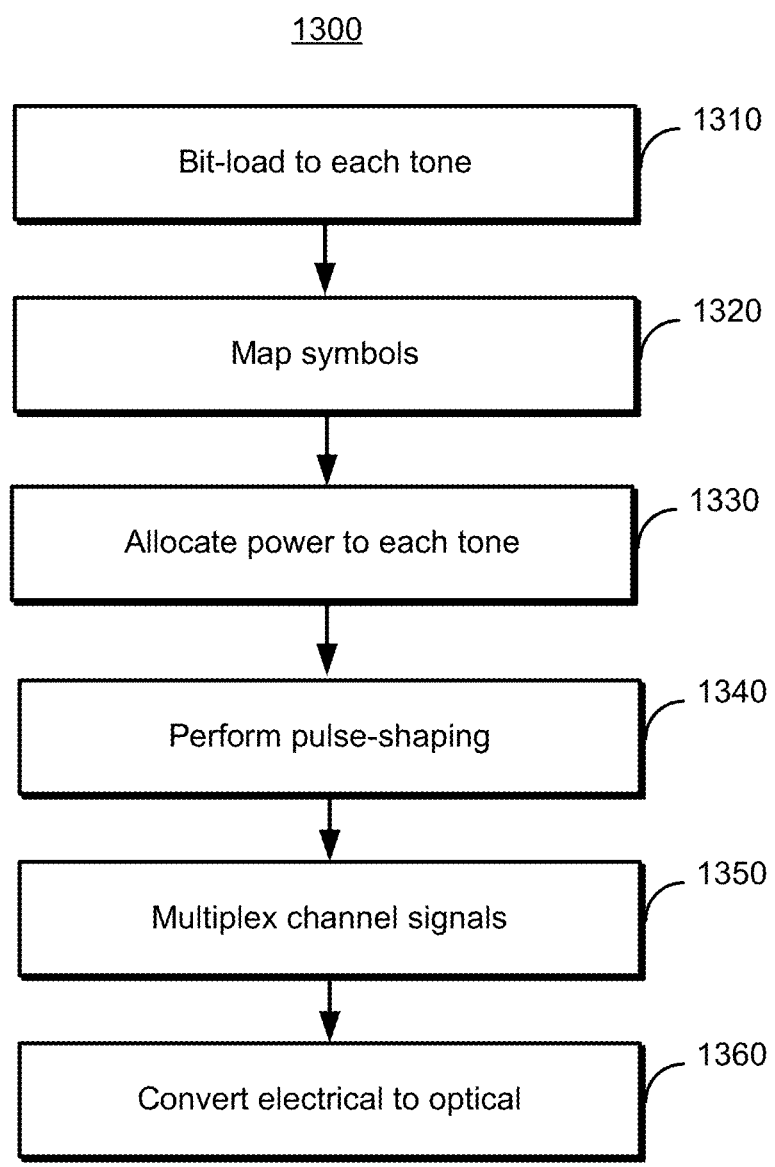
FIG. 13 is a flow diagram showing an optical communication method at the transmitter.

FIG. 13 illustrates an optical communication method 1300, which may be implemented by a transmitter side of the optical communication network (e.g., TX DSP 112 of FIG. 1, TX DSP 310 of FIG. 3, TX DSP 500 of FIG. 5). Incoming bits streams are converted into N groups of bits for N tones to optimize a bit-rate to each tone with a flexible bit-loading scheme (1310). Each bit stream with a unique bit rate for a tone is mapped to a symbol with a modulation format (1320). The power of one or more of the symbols is optimized with a flexible power-allocation scheme (1330), which may be implemented using a LUT (e.g., 330 of FIG. 3, 1200 of FIG. 12). The modulated N bit signals may be transformed from a time domain to a frequency domain, e.g., by applying FFTs to generate a plurality of channel signals, and then may be filtered to perform pulse-shaping (1340). The resultant channel signals are multiplexed (1350), e.g., by applying a large IFFT (e.g., 570 of FIG. 5) to output a digital electrical signal. The digital electrical signal may be converted to an analog signal, e.g., by using a DAC (e.g., 340 of FIG. 3), and then converted to an optical signal for transmission (1360).

Figure 14:
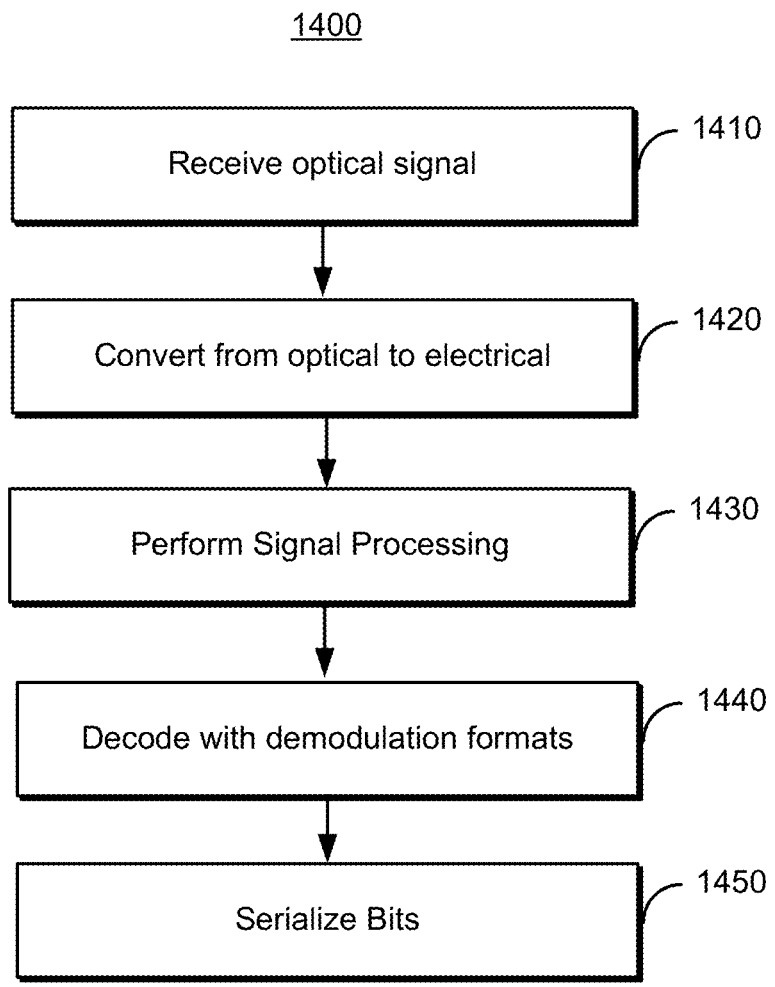
FIG. 14 is a flow diagram showing another optical communication method at the receiver.

FIG. 14 illustrates an optical communication method 1400, which may be implemented by a receiver side of the optical communication network (e.g., RX DSP 132 of FIG. 1, RX DSP 410 of FIG. 4, RX DSP 800 of FIG. 8). The method 1400 may include functions implemented by a transmitter side of the optical communication network. An optical signal is received (1410). The optical signal is converted to a digital electrical signal (1420), e.g., by an O/E conversion and AD conversion. The digital electrical signal may be transformed to a frequency domain, e.g., by applying a FFT (e.g., 810 of FIG. 8) to generate a plurality of channel signals. The digital electrical signal may be processed for compensation of distortion and for carrier recovery in each tone (1430). The processed signals are decoded with demodulation formats (1440) that correspond to modulation formats employed in a transmitter side. The demodulated bit signals are serialized to restore their original order (1450).

Figure 15:
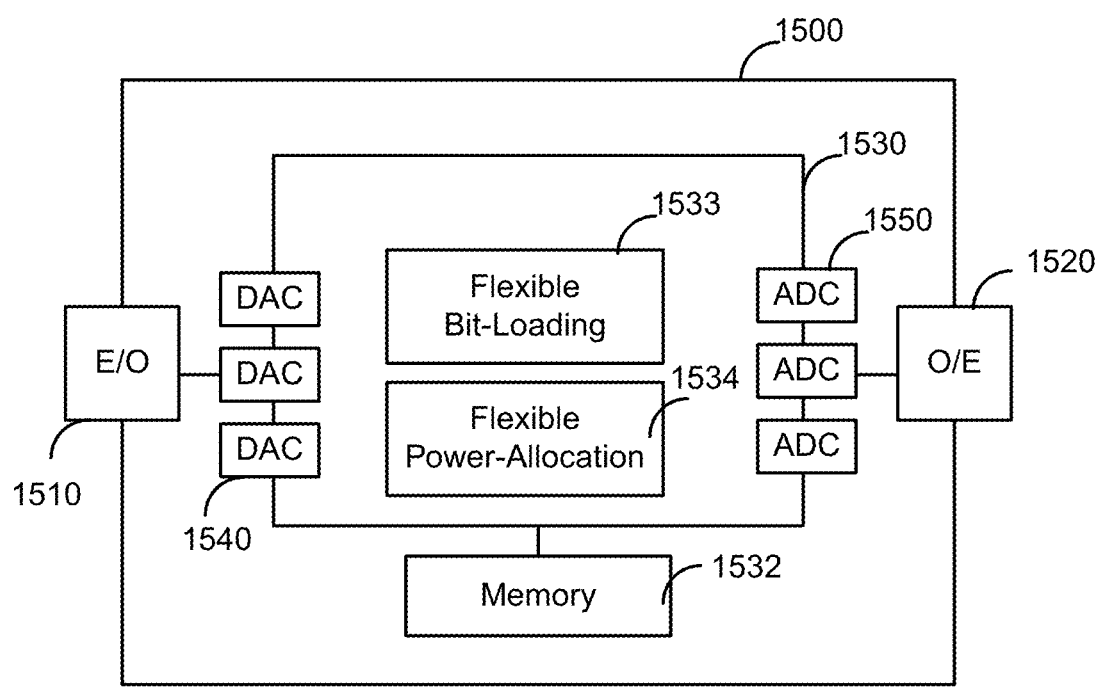
FIG. 15 is a block diagram of a transceiver unit.

FIG. 15 illustrates a transceiver unit 1500, which may be any device that transmits and/or receives optical signals with encoded data. For example, the transceiver unit 1500 may be located in an optical communication system, which may implement transmitter 110 and the receiver 130 shown in FIG. 1. The transceiver unit 1500 may be a coherent optical transceiver. The transceiver unit 1500 may be configured to implement or support any of the schemes described herein, such as the multi-modulation DMT scheme, flexible bit-loading, flexible power-allocation and the optical communication methods 1300 and 1400 of FIGS. 13 and 14. The transceiver unit 1500 may also act as other node(s) in an optical transport network (OTN), such as an optical line terminal (OLT), an optical network unit (ONU), and/or other optical network elements. The term transceiver unit encompasses a broad range of devices of which transceiver unit 1500 is an example. The transceiver unit 1500 is included for purposes of clarity of discussion only, but is in no way meant to limit the application of the present disclosure to a particular transceiver unit or class of transceiver unit.

For instance, the features/methods in the disclosure may be implemented using hardware, firmware, and/or software installed to run on hardware. As shown in FIG. 15, the transceiver unit 1500 may include an electrical to optical (E/O) frontend 1510 and/or an optical to electrical (O/E) frontend 1520, which may convert an electrical signal to an optical signal for transmission in an OTN and/or receive an optical signal from the OTN and convert the optical signal to an electrical signal, respectively. A processor 1530 may be coupled to the E/O frontend 1510 and the O/E frontend 1520 via a plurality of DACs 1540 and ADCs 1550, respectively, which may or may not be part of the processor 1530. The DACs 1540 may convert digital electrical signals generated by the processor 1530 into analog electrical signals that may be fed into the E/O frontend 1510. The ADCs 1550 may convert analog electrical signals received from the O/E frontend 1520 into digital electrical signals that may be processed by the processor 1530. If the transceiver unit is at a transmitter side, the processor 1530 may include a flexible bit-loading unit 1533 for bit-loading to each tone and a flexible power-allocation module 1534 for power-allocation to one or more tones. The processor 1530 may be coupled to one or more multi-core processors and/or memory modules 1532, which may function as data stores, buffers, etc. The memory module 1532 may include a look up table for the flexible power-allocation. The processor 1530 may be implemented as a general processor or may be part of one or more ASICs and/or DSPs. The flexible bit-loading unit 1533 and flexible power-allocation module 1534 may be implemented as instructions stored in the memory module 1532, which may be executed by the processor 1530. The memory module 1532 may include a cache for temporarily storing content, e.g., a Random Access Memory (RAM). Additionally, the memory module 1532 may include a long-term storage for storing content relatively longer, e.g., a Read Only Memory (ROM). For instance, the cache and the long-term storage may include dynamic random access memories (DRAMs), solid-state drives (SSDs), hard disks, or combinations thereof. The processor 1530 is a programmable processor, and executable instructions may be loaded onto the transceiver unit 1500, at least one of the processor 1530 and/or memory module 1532. Each of parallel processing branches in a transmitter side (e.g., 112 of FIG. 1, 310 of FIG. 3, 500 of FIG. 5) may be configured using the executable instructions, which may include a bit rate, modulation format of each branch, the total number of branches and the bit-loading and power-allocation schemes of the branches. Each of parallel processing branches in a receiver side (e.g., 132 of FIG. 1, 410 of FIG. 4, 800 of FIG. 8) may be configured using the executable instructions, which may include a demodulation modulation format of each branch and the total number of branches.

Any processing of the disclosure may be implemented by causing a processor, digital signal processors (DSP), application-specific integrated circuit (ASIC), or components of a processor in a system (e.g., 110, 130 of FIG. 1) to execute a computer program or provide functions. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as magnetic tapes, hard disk drives, flash memory, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. The term "configured to (perform a task)" as used herein includes being programmable, programmed, connectable, wired or otherwise constructed to have the ability to perform the task when arranged or installed as described herein.

While several embodiments have been provided in the present disclosure, it may be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. A number of variations and modifications can be made without departing from the scope of the invention as defined in the claims.

What is claimed is:

1. A device for optical discrete multi-tone (DMT) transmission, comprising:
   a demultiplexer configured to convert a serial data to groups of bits and to load each of a plurality of parallel processing branches with associated group of data bits, based on bit rates of the plurality of parallel processing branches,
   wherein each branch of the plurality of parallel processing branches is configured to:
      encode the associated group of data bits on an associated tone; and
      apply a respective Fast Fourier Transform (FFT) to the encoded group of data bits, and
   a multiplexer for multiplexing outputs of the plurality of branches together with a null between every two neighboring outputs of the plurality of branches,
   wherein a first bit rate or modulation of a first branch of the plurality of parallel processing branches is different from a second bit rate or modulation of a second branch of the plurality of parallel processing branches.

2. The device of claim 1, wherein each branch of the plurality of parallel processing branches comprises
   an encoder configured to generate a symbol with an associated modulation, wherein the device is configured to allocate power to the plurality of parallel processing branches to emphasize one or more of the symbols, wherein power allocated to the first branch is different from a power allocated to the second branch.

3. The device of claim 1, wherein the first branch is configured to encode a first group of data bits of the groups of bits on a first tone with a lower order modulation format, wherein the second branch is configured to encode a second group of data bits of the groups of bits on a second tone with a higher order modulation format.

4. The device of claim 1, wherein modulation formats comprise one of more of: Binary Phase shift Keying (BPSK), Quadrature Phase Shift Keying (QPSK), N Phase Shift Keying (PSK) (N≥8), N Quadrature Amplitude Modulation (QAM) (N≥8), and any dual-polarization variant.

5. The device of claim 1, wherein the device is configured to adaptively arrange compensation for distortion of signals in each branch of the plurality of parallel processing branches.

6. The device of claim 1, wherein the device is a coherent optical transceiver.

7. The device of claim 3, wherein each branch of the plurality of parallel processing branches comprises
   an encoder configured to generate a symbol with an associated modulation, wherein the device is configured to allocate a first power to at least the first branch to emphasize the associated symbol of the first branch.

8. The device of claim 3, wherein the device is configured to
   allocate power to the first branch based on a signal-to-noise ratio (SNR) difference between the lower order modulation and the higher order modulation formats to compensate the SNR difference or based on bandwidth arrangement of the branches.

9. The device of claim 2, wherein the device is configured to
   perform the power allocation to maintain a bit error rate (BER) at a lowest value.

10. The device of claim 2, wherein the device is configured to:
    perform the power allocation using a look up table.

11. A method for optical discrete multi-tone (DMT) transmission, comprising:
    receiving a stream of serial data;
    converting the serial data to groups of bits and loading each branch of a plurality of parallel processing branches with an associated group of data bits, based on bit rates of the plurality of parallel processing branches, wherein each branch of the plurality of parallel processing branches is configured to encode the associated group of data bits on an associated tone and apply a respective Fast Fourier Transform (FFT) to the encoded group of data bits, wherein a first bit rate or modulation of a first branch of the plurality of parallel processing branches is different from a second bit rate or modulation of a second branch of the plurality of parallel processing branches; and
    multiplexing outputs of the plurality of branches together with a null between every two neighboring outputs of the plurality of branches.

12. The method of claim 11, comprising:
    using each of the plurality of parallel processing branches, generating a symbol with an associated modulation, and
    allocating a power to each branch of the plurality of parallel processing branches to emphasize one or more of the symbols, wherein a power allocated to the first branch is different from a power allocated to the second branch.

13. The method of claim 11, wherein loading to each branch of a plurality of parallel processing branches the associated group of data bits comprises
loading a first group of data bits of the groups of bit to a first branch of the plurality of parallel processing branches, and a second group of data bits of the groups of bits to a second group of the plurality of parallel processing branches, a size of the first group of data bits being different from that of the second group of data bits, wherein the first branch is configured to encode the first group of data bits on a first tone with a lower order modulation format, and wherein the second branch is configured to encode the second group of data bits on a second tone with a higher order modulation format.

14. The method of claim 11, comprising
adaptively arranging compensation for distortion of signals in each branch.

15. The method of claim 12, wherein allocating a power comprises
determining a power factor on each branch of the plurality of parallel processing branches to maintain a bit error rate (BER) at a lowest value.

16. The method of claim 12, wherein allocating a power comprises
determining a power factor on each branch of the plurality of parallel processing branches based on a required signal-to-noise ratio (SNR) difference between a difference of modulations of the branches to compensate the SNR difference or based on bandwidths of the branches.

17. The method of claim 13, comprising:
using each branch of the plurality of parallel processing branches, generating a symbol with an associated modulation, and
allocating different powers on the first branch and the second branch to emphasize the symbol of one of the first branch and the second branch.

18. A computer readable non-transitory memory storing one or more programs, the one or more programs comprising instructions, which when executed by a computer device, cause device processor to perform a method for optical discrete multi-tone (DMT) transmission, comprising:
receiving a serial data;
converting the serial data to groups of bits and loading each of a plurality of parallel processing branches with an associated group of data bits, based on bit rates of the plurality of parallel processing branches, wherein each branch is configured to encode the associated group of data bits on an associated tone and to apply a respective Fast Fourier Transform (FFT) to the encoded group of data bits, wherein a first bit rate or modulation of a first branch of the plurality of parallel processing branches is different from a second bit rate or modulation of a second branch of the plurality of parallel processing branches; and
multiplexing outputs of the plurality of branches together with a null between every two neighboring outputs of the plurality of branches.

* * * * *